(12) United States Patent
Whitechapel et al.

(10) Patent No.: US 10,467,069 B2
(45) Date of Patent: Nov. 5, 2019

(54) SELECTIVE APPLICATION INSTANCE ACTIVATION

(71) Applicant: Microsoft Technology Licensing, LLC, Redmond, WA (US)

(72) Inventors: David A. Whitechapel, Seattle, WA (US); Anis Mohammed Khaja Mohideen, Redmond, WA (US); Sergei Ognerubov, Snoqualmie, WA (US); Timothy M. Kurtzman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/945,693

(22) Filed: Apr. 4, 2018

(65) Prior Publication Data

US 2019/0310903 A1   Oct. 10, 2019

(51) Int. Cl.
*G06F 3/00* (2006.01)
*G06F 9/54* (2006.01)

(52) U.S. Cl.
CPC .................. *G06F 9/544* (2013.01)

(58) Field of Classification Search
CPC ........................................................ G06F 9/54
USPC ....................................................... 719/310
See application file for complete search history.

(56) References Cited

U.S. PATENT DOCUMENTS

| | | | |
|---|---|---|---|
| 5,828,843 A * | 10/1998 | Grimm | G06F 9/5027 709/228 |
| 6,341,368 B1 | 1/2002 | Deans | |
| 6,567,849 B2 | 5/2003 | Ludovici et al. | |
| 6,845,505 B1 | 1/2005 | Adunuthula et al. | |
| 7,702,691 B2 * | 4/2010 | White | G06F 16/2433 707/781 |
| 8,448,090 B2 | 5/2013 | van der Meulen et al. | |
| 8,606,875 B1 * | 12/2013 | Chouanard | H04L 9/3268 709/217 |
| 8,635,254 B2 | 1/2014 | Harvey et al. | |
| 8,997,093 B2 | 3/2015 | Dimitrov | |
| 2009/0235200 A1 * | 9/2009 | Deutsch | G06F 9/451 715/783 |

(Continued)

OTHER PUBLICATIONS

C. Krupczak, Definitions of System-Level Managed Objects for Applications (Year: 1998).*

(Continued)

*Primary Examiner* — Lechi Truong
(74) *Attorney, Agent, or Firm* — Fountainhead Law Group P.C.

(57) ABSTRACT

In one embodiment, a computer system stores entries for one or more instances of an application with keys generated for the instances in storage. The instances of the application are instantiated on the computer system. The computer system receives a request from the application with a current key for a current instance and parses the storage to determine if the current key is stored in the keys associated with the application. The computer system returns a response to the application with an indication whether the current key is stored as an entry in the one or more entries. The application uses the response to determine a redirection action to one of the one or more instances of the application when the current key is associated with an instance other than the current instance.

19 Claims, 9 Drawing Sheets

(56) References Cited

U.S. PATENT DOCUMENTS

2013/0254125 A1* 9/2013 Sanders ............... H04L 63/102
                                                      705/310
2016/0261684 A1* 9/2016 Khalaf ............... H04L 67/1002

OTHER PUBLICATIONS

"Access Existing WPF App Instance?", Retrieved from «https://web.archive.org/web/20090629153229/https:/stackoverflow.com/questions/1007948/access-existing-wpf-app-instance», Jun. 29, 2009, 1 Page.

"Activity", Retrieved from «https://web.archive.org/web/20180104004213/https:/developer.android.com/guide/topics/manifest/activity-element.html», Jan. 4, 2018, 25 Pages.

"Android—URI Scheme—Stop from Opening Multiple Instances of Application", Retrieved from «https://stackoverflow.com/questions/31069732/android-uri-scheme-stop-from-opening-multiple-instances-of-application?rq=1», Retrieved on: Feb. 12, 2018, 2 Pages.

"Intent", Retrieved from «https://web.archive.org/web/20180105044628/https:/developer.android.com/reference/android/content/Intent.html», Jan. 5, 2018, 534 Pages.

"Registering Existing Object Instances", Retrieved from «https://web.archive.org/web/20150118063106/https:/msdn.microsoft.com/en-us/library/ff648449.aspx», Jan. 18, 2015, 3 Pages.

Iovino, Giancarlo, "A Single Instance Application Class", Retrieved from «https://www.codeguru.com/cpp/misc/misc/article.php/c231/A-Single-Instance-Application-Class.htm#WHATSNEW», Aug. 6, 1998, 26 Pages.

* cited by examiner

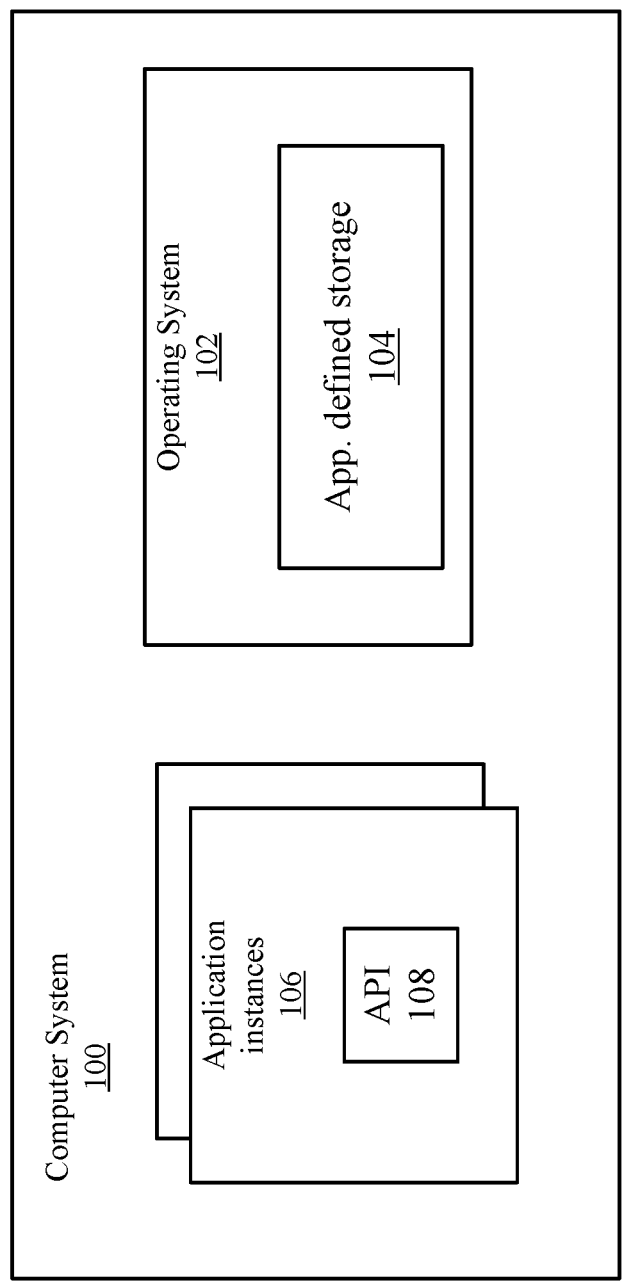

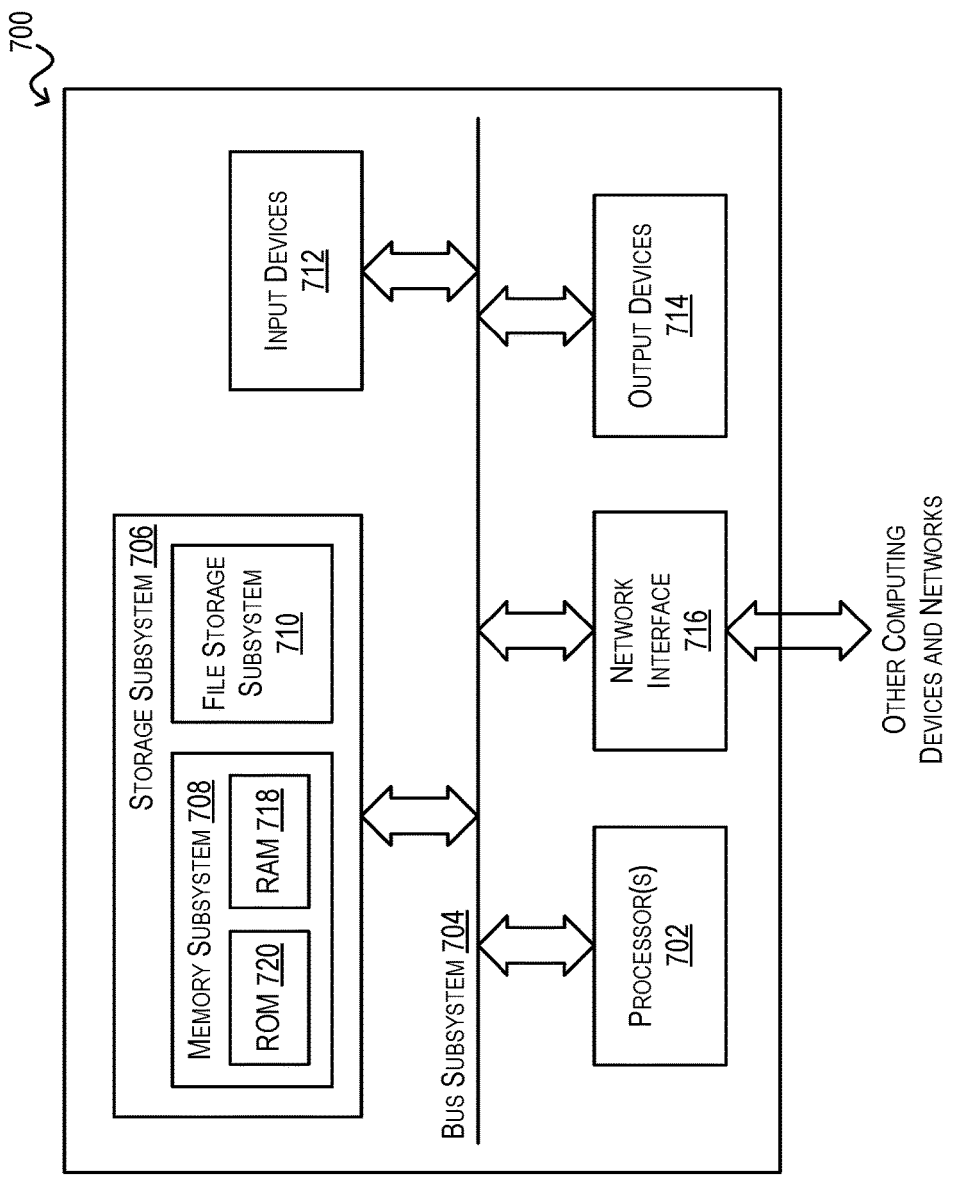

SELECTIVE APPLICATION INSTANCE ACTIVATION

BACKGROUND

A platform may allow only one instance on of application to be active at a time. An application would be limited to using multiple windows for the single instance. However, the same process is controlling the windows. When problems occur with the process, such as the process fails or hangs, every window is affected.

A platform may also allow an application to be multi-instanced. If the platform allows multi-instancing, then the code that an application could use to communicate with other instances would be application-specific. For example, a developer may write application-specific software code to enable the application to open multiple instances. However, the software code to allow the application to be multi-instanced is not integrated with the platform since the code is application-specific. This may limit the functionality and errors may result. For example, the multiple instances of the application communicate via application to application messages. If one of the instances fails or is shut down, then a message sent by one of the applications to a failed or shut down instance would result in an error.

BRIEF DESCRIPTION OF THE DRAWINGS

FIG. 1 depicts a computer system for enabling multi-instance functionality for applications according to some embodiments.

FIG. 7 depicts a simplified block diagram of an example computer system according to certain embodiments.

DETAILED DESCRIPTION

Figure 2A:
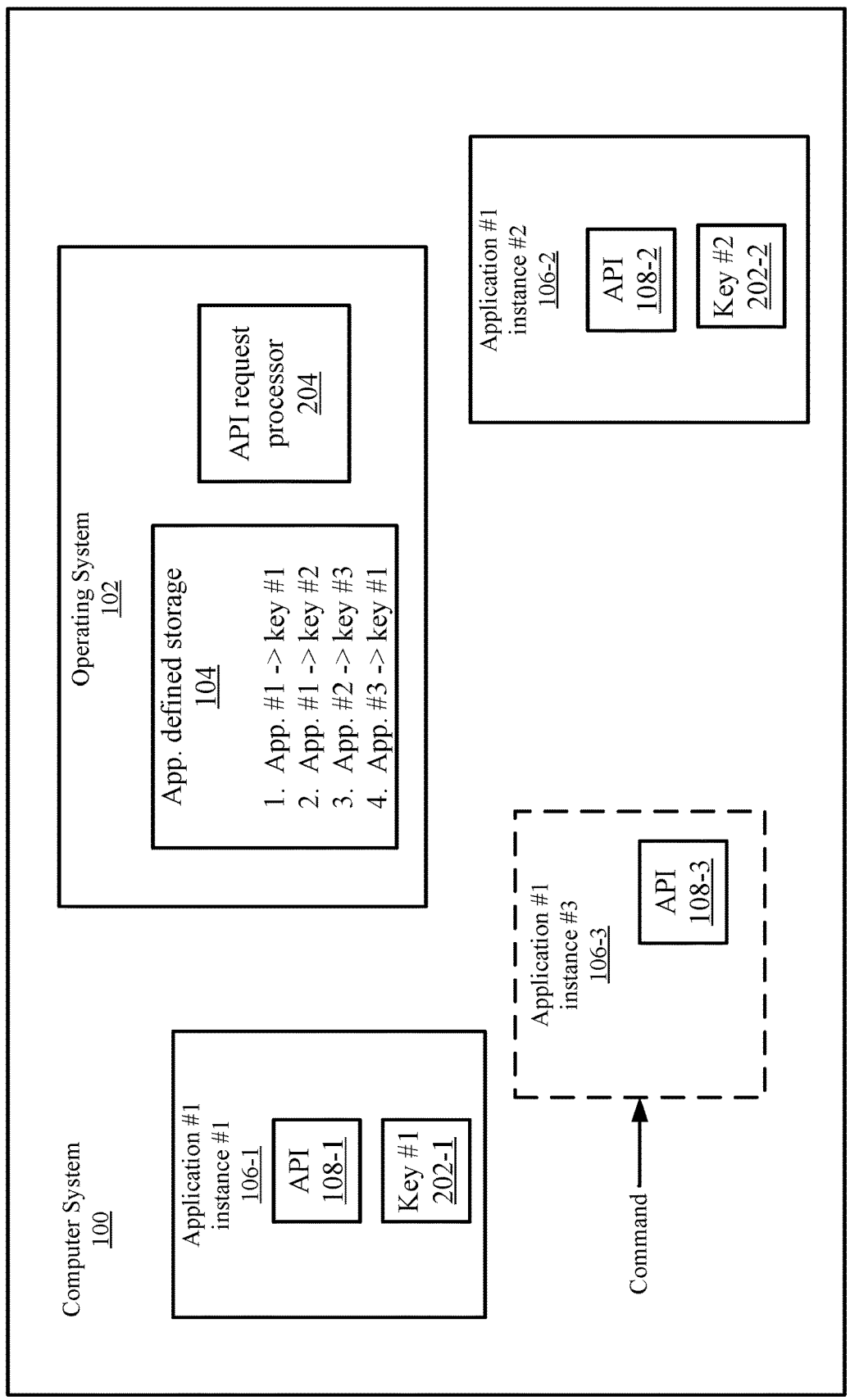
FIG. 2A depicts an example of the computer system when a command for an application instance is received according to some embodiments.

A computer system provides a platform that allows applications to open multiple instances. For example, the platform includes an operating system that provides an interface, such as an application programming interface (API), that applications can use to manage multiple instances of an application. Using the API, an application can store application-defined data for the instances. For example, storage in the platform may store keys for each instance of the application. Then, when the platform receives an input to create a new instance, the application uses arguments for the input to generate a key for the instance. Then, the application communicates, using the API, with the operating system to determine whether a current instance already has registered the key. If a current instance has already registered the key, the application can perform different actions. For example, the application may redirect the request to the already-existing instance of the application. If the key has not already been registered, then the application can create the instance of the application and register the key for that instance.

Using the API of the platform standardizes the multi-instance functionality that is used by applications. The applications can communicate with the operating system to have actions performed instead of using application to application communications. Using the operating system API provides additional functionality to the applications and also may decrease errors. The operating system can keep better track of the running instances than the application. Specifically, the operating system can filter out instances that are still in memory but are in the process of crashing, choose to filter out (or filter in) instances that are suspended, identify a specific instance as the preferred instance from an OS-wide perspective, keep the instance/key table in system storage where it is guaranteed to be available and protected. If the application had to maintain this list in memory, the list is vulnerable when an instance of the application closes or fails. If the list kept on a storage disk, the list would incur significant performance penalty and require sophisticated read/write synchronization support System FIG. 1 depicts a computer system 100 for enabling multi-instance functionality for applications according to some embodiments. Computer system 100 may include a platform of an operating system (OS) 102 and computer hardware. As is known, the operating system manages the computer hardware and software resources and provides services for the applications running on the operating system.

Application 106 may be any type of application that is running on computer system 100. Examples of application 106 include word processing applications, digital assistants, Internet browsers, etc. In some embodiments, application 106 may open instances in different windows. For example, a word processing application may open up multiple windows where each window includes a different document that can be edited.

The platform may allow applications to be multi-instanced. Each instance of the application may be associated with a different process. Each process is created separately and is independent of the other processes. Thus, if one process crashes, the other processes are not affected. This is different than a single process managing multiple windows. When the single process crashes or is closed, all the windows for that process are closed.

To enable the multi-instance functionality, application 106 includes an application programming interface (API) 108 that is supported and provided by operating system 102. API 108 allows application 106 to be multi-instanced and also allows a redirection from a new activation command to an existing instance. Application 106 uses API 108 to communicate with operating system 102 to enable the multi-instance functionality. As will be described in more detail below, API 108 allows application 106 to store application-defined (APP-defined) data in operating system storage 104. Operating system 102 and application instances 106 use the application-defined data to manage the instances of application 106. For example, application 106 may use API 108 to check whether an instance has already been registered. If that instance has been registered, application 106 uses API 108 to redirect the request to the existing instance.

The application-specific data stored in operating system storage 104 is storage controlled and maintained by operating system 102. The APP-defined data allows operating system 102 to provide information specific to the application instead of global information from all applications running on operating system 102. This results in a more efficient diagnosis by application 106 as to whether an instance of application 106 already exists. If global information was being stored, then application 106 would not know which instances were associated with which applications. Rather, operating system 102 could only return all instances from all applications that are active and there was no well-defined format or standard used to register and store the data. For example, different applications could use any range of techniques that were not defined, which could result in the same key or identifier being used. Also, application 106 uses API 108 to perform the redirection to the existing instance. The redirection may go through operating system 102, which provides additional stability. For example, if an application-to-application communication was used, it is possible that the redirection may fail because there is not an active instance for the redirection anymore. For example, the instance of the application may be shut down during the time the redirection request is being processed. In this case, redirection may fail. However, using operating system 102, operating system 102 can determine the status of the existing application 106 and open the existing instance. For example, operating system 102 can exclude an instance that is failing, a failed instance, or suspended instances when providing an instance of the application for redirection.

Different Examples of Operation

Figure 2B:
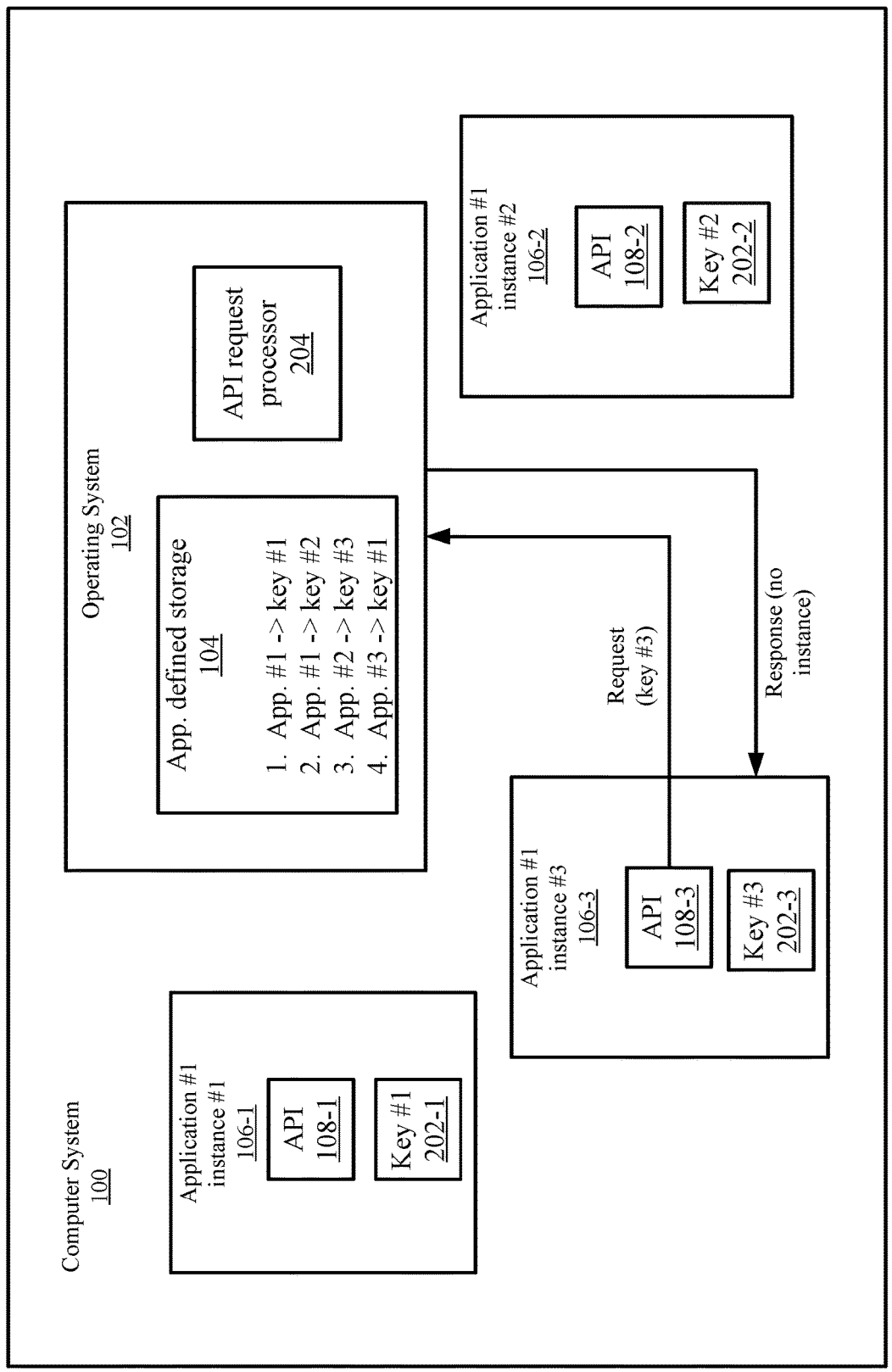
FIG. 2B depicts a scenario where an existing instance for the application with the same key does not exist according to some embodiments.
Figure 2C:
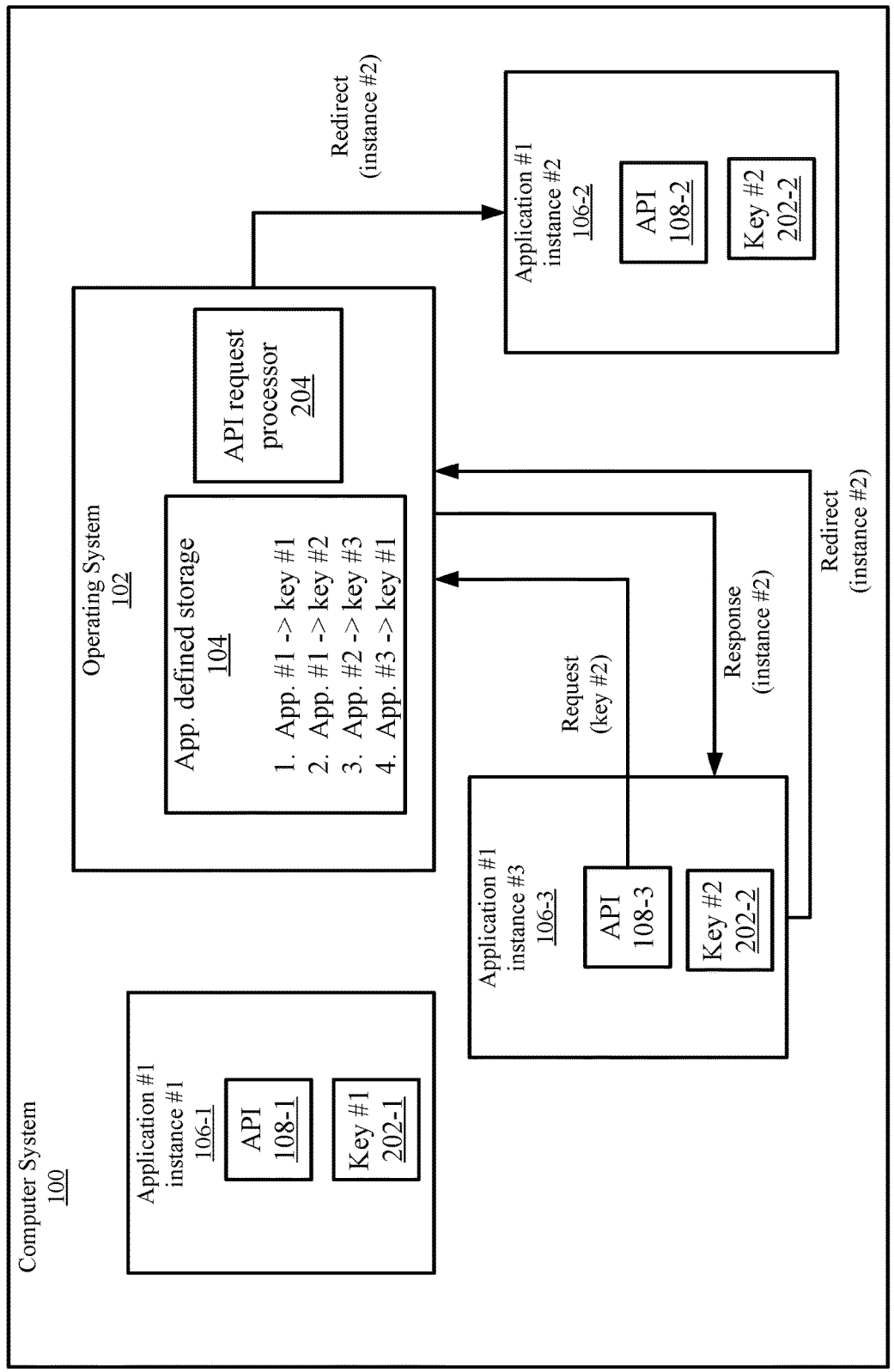
FIG. 2C depicts a scenario in which a key is already registered for the application according to some embodiments.

FIGS. 2A to 2C depict different examples of operations that can be performed using API 108 according to some embodiments. FIG. 2A depicts an example of computer system 100 when a command for an application instance is received according to some embodiments. Computer system 100 may allow multiple commands to be performed for application 106, such as multiple activation requests. The command may be an activation request from an input, such as a tile click, file activation by double clicking a file, protocol activation by invoking the applications protocol, toast activation when the user selects the application's toast, command line execution, and so on. Each activation may be a request that causes a fresh instance to be created.

An application 106 (application #1) may have two existing instances: a first instance 106-1 (instance #1) and a second instance 106-2 (instance #2). For example, instance #1 may be editing a first document and instance #2 may be editing a second document. Instance #1 may generate a first key 202-2 (key #1) when the instance is instantiated. Application 106 may generate key #1 based on arguments associated with a request. For example, when a command is received to instantiate the instance, instance #1 retrieves arguments for the command. The arguments could be any application defined information or system defined information, such as the document name and other information. Then, instance #1 generates a unique key based on the arguments and/or application defined logic used to generate the key. For example, the key may be a text string or may include other information. As shown, instance #1 has created a key #1.

Once generating key #1, application #1 sends a request with the key #1 to operating system 102. An API request processor 204 in operating system 102 may process the requests. In this scenario, an instance has not been instantiated before with key #1 and operating system 102 stores key #1 in operating system storage 104. Key #1 is also associated with the specific instance #1 of application #1. In storage 104, other applications, such as applications #2 and #3 may also include APP-defined data.

A second instance of application #1, a second instance 106-2 (instance #2) may also have been instantiated. Instance #2 may receive a command and generate a second key 202-2 (key #2) using the arguments for the command. Then, instance #2 uses API 108-2 to communicate key #2 to operating system 102. Also, in this example, an existing instance with key #2 has not been created for application #1, and key #2 is stored in operating system storage 104 and associated with application #1.

At a later time, application #1 may receive a command for an instance #3 106-3. In some embodiments, the command may be to instantiate a new instance #3. However, in other embodiments, the command may execute other functions with an already-instantiated instance, such as generate an image or perform an edit. Different scenarios may result after receiving the command, some of which are described in FIGS. 2B and 2C.

FIG. 2B depicts a scenario where an existing instance for the application with the same key does not exist according to some embodiments. Instance #3 creates a third key 202-3 (key #3) based on arguments for the command and key generating logic. In this case, key #3 is different from key #1 and key #2. Then, instance #3 sends a request with key #3 to operating system 102. API request processor 204 then looks up application #1 in operating system storage 104 and determines if a key #3 has already been registered. In this example, key #3 has not already been registered for application #1. A key #3 may have been generated for an application #2; however, application #2 is different from application #1. Thus, API request processor 204 determines that an instance with key #3 for application #1 does not exist. API request processor 204 then sends a response that there is no existing instance with key #3. For example, the response may include a null string or other information that indicates that there is not an existing instance that registered key #3.

Once receiving the response that there is not an existing instance, instance #3 may then perform the command as normal, such as opening a new window for instance #3. API request processor 204 may also store key #3 associated with application #1 in operating system storage 104.

FIG. 2C depicts a scenario in which a key is already registered for the application according to some embodiments. In this example, instance #3 receives a command and creates key #2. Key #2 is the same as the key associated with instance #2 of application #1. Instance #3 uses API 108-3 to send a request with key #2 to operating system 102. API request processor 204 then determines that key #2 is stored in operating system storage 104 and associated with application #1. API request processor 204 sends a response with information identifying instance #2 has already registered with key #2 for application #1. For example, the response may include the string with the instance identified and an indication the registration failed. In other examples, the response may indicate that key #2 was registered with another instance and/or identify the instance.

Once application #1 receives the response, instance #3 may then take different actions. An application or instance can register as being able to receive redirections. In some embodiments, instance #3 may then redirect the command to instance #2. Instead of using an application-to-application message, instance #3 uses API 108-3 to communicate the redirect for instance #2 to operating system 102. Then, operating system 102 can issue the redirect to instance #2 and include a context. The context may be any information about the redirect, such as a command to bring the window forward. For example, the result of the redirect may bring forward instance #2 on the display screen and the focus may be transferred to instance #2. Using operating system 102 to perform this action may be more reliable than using an application-to-application communication because operating system 102 controls the execution of the command and can recover from some problems, such as the instance being shut down. Accordingly, using API 108-3 in instance #3 provides a more stable redirection. Without having API 108-3, application #1 would be limited to an application to application communication that may result in an error. Also, using the API also has the benefit that the application can include one set of code to handle an activation request—the application does not need to distinguish an initial activation from a redirected activation. This simplifies the application code and logic and ensures that because both initial activation and redirected activated go through the exact same system workflow, the behavior that the user sees is always consistent. If the redirection were left to the application to do instead, it could result in inconsistent user experience, and it would mean significant additional code/logic for the application developer. Additionally, each app might choose to do it differently resulting in an even more inconsistent user experience.

Method Flows

Figure 3:
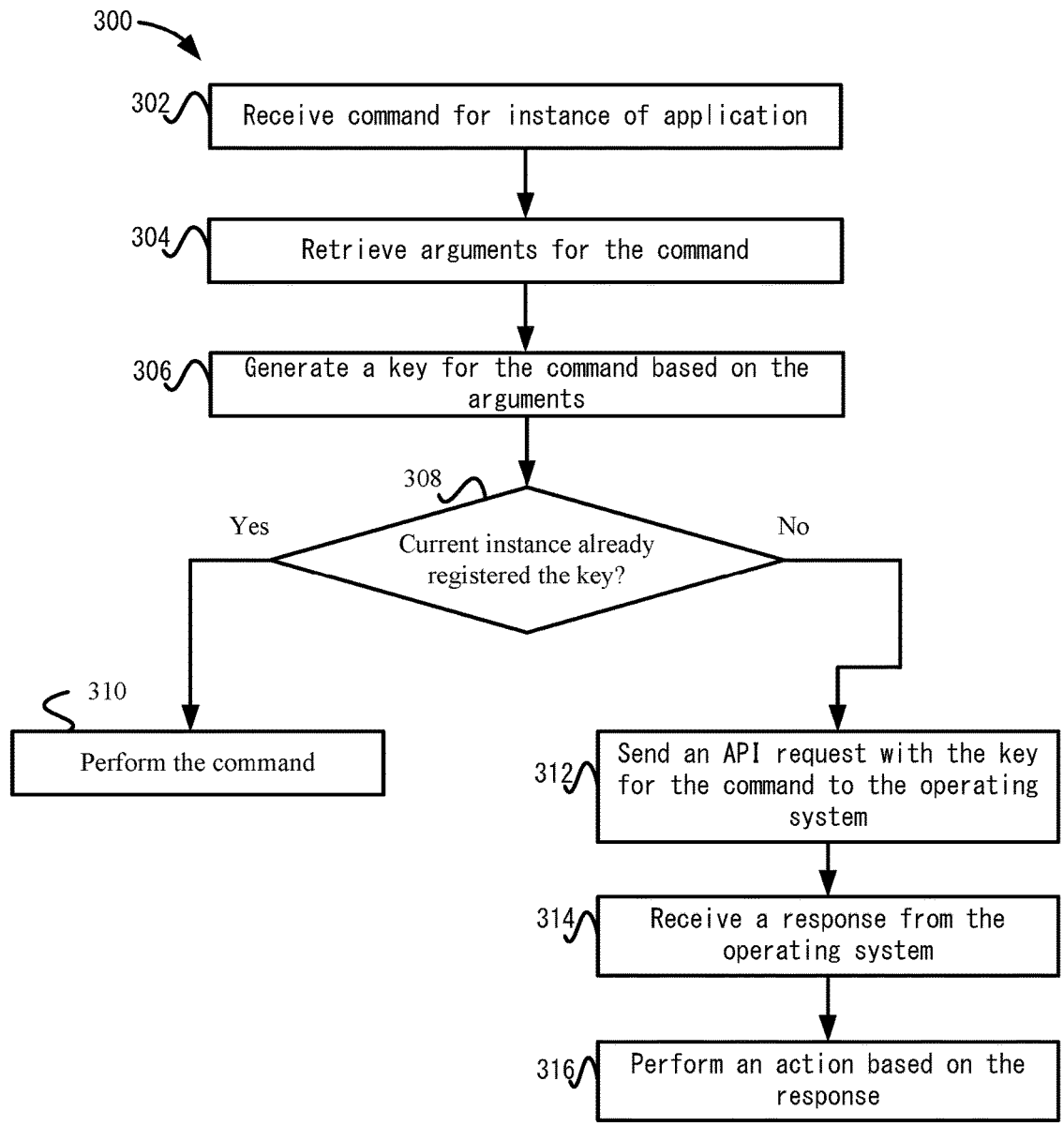
FIG. 3 depicts a simplified flowchart of a method for processing a command according to some embodiments.

FIG. 3 depicts a simplified flowchart 300 of a method for processing a command according to some embodiments. At 302, an application 106 receives a command for an instance of the application. As discussed above, the command may be for opening an instance. The interception of an activation command may be performed immediately after the process is created and before any application window creations are performed. This may significantly reduce the time taken to redirect an activation. Using API 108 allows the activation request to be intercepted and processed this early in the lifecycle of processing the command.

At 304, application 106 retrieves arguments for the command. The arguments may be based on the command or an event associated with the command. In some embodiments, the arguments may be associated with a document that is being opened.

At 306, application 106 generates a key for the command based on the arguments. The key is unique based on the arguments provided and different algorithms may be used to generate a key.

At 308, application 106 determines if the current instance already registered the key. For example, this current instance may have already registered the key with operating system 102 and the registration was confirmed. Accordingly, application 106 may not need to check if this key is registered again. If the current instance had already registered the key, then at 310, application 106 performs the command, such as opening the new instance.

If the current instance had not already registered the key, then, at 312, application 106 sends an API request with the key for the command to operating system 102. At 314, application 106 receives a response from operating system 102. As discussed above, responses may include an indication that the key is registered with another instance or that the key is not registered by another instance of the application.

At 316, application 106 performs an action based on the response. The different types of actions will be described in more detail below, but may include performing the command or performing a redirection.

Figure 4:
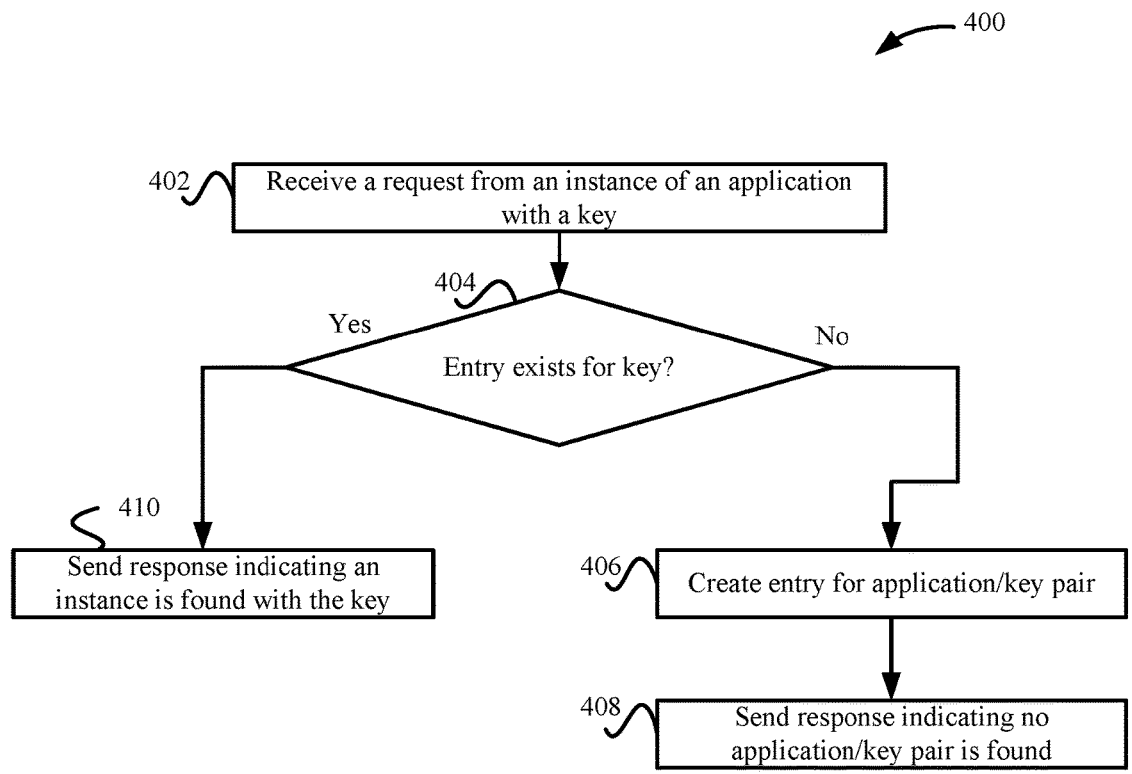
FIG. 4 depicts a simplified flowchart of a method for processing a request with a key according to some embodiments.

The next method flow describes processing by operating system 102. FIG. 4 depicts a simplified flowchart 400 of a method for processing a request with a key according to some embodiments. At 402, operating system 102 receives a request with a key from an instance of an application. At 404, operating system 102 determines if an entry exists for the key. As discussed above, operating system storage 104 may store keys with the application. Operating system 102 can look up a key pair in a table using application #1 and the key received in the request. Alternatively, operating system 102 may retrieve all registered keys for application #1 and compare the keys with the key received in the request. If an entry for the key received in the request already exists, then operating system 102 sends a response indicating an instance is found with the key. For example, the entry in operating system storage 104 may identify the instance. If an entry does not exist for the key, at 406, operating system 102 creates an entry for the application/key pair in operating system storage 104. This registers the key for the instance. At 408, operating system 102 sends a response indicating there is no application/key pair found in operating system storage 104.

Figure 5:
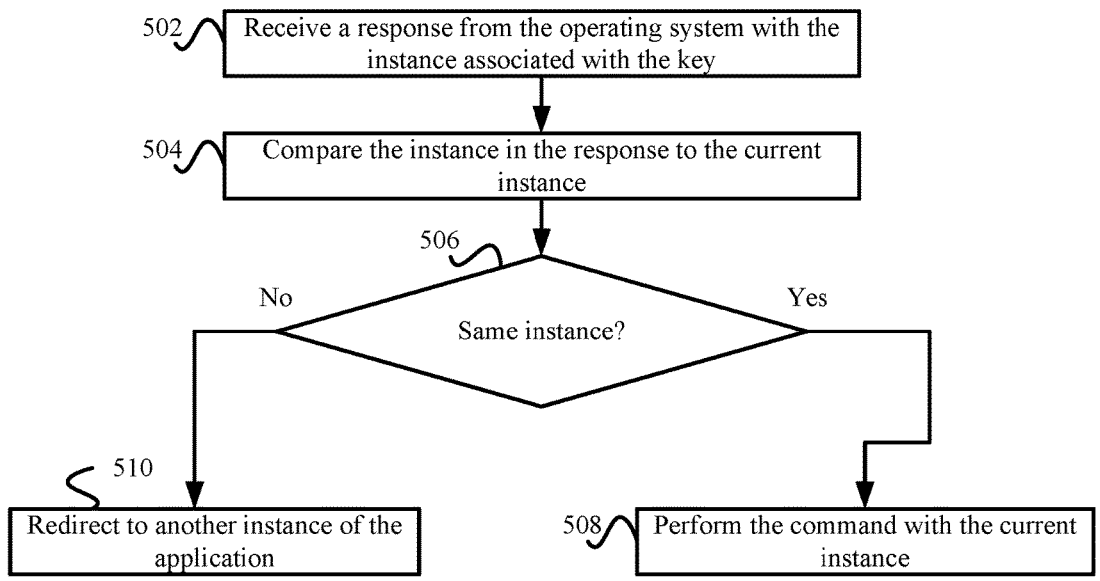
FIG. 5 depicts a simplified flowchart of a method for processing a response from an operating system at an application according to some embodiments.

FIG. 5 depicts a simplified flowchart 500 of a method for processing a response from operating system 102 at application 106 according to some embodiments. At 502, application 106 receives a response with the instance associated with the key. At 504, application 106 compares the instance in the response to the current instance. Assuming an instance is returned, the instance may be associated with the current instance that sent the request or may be associated with another instance that has already been instantiated. In some embodiments, a key may be registered for one instance of an application only once. If an instance of the application attempts to register a key that has already been registered for a different instance, operating system 102 returns the registered instance. Then, application 106 can check whether it is the current instance. That is, if instance #1 is already registered, then operating system 102 returns instance #1 as the registered instance. When instance #1 has sent the request, then it is the current instance. Otherwise, the instance that sent the request is not the current instance.

In some examples, when the current instance is received in response, the current instance may have previously registered the key. In other examples, when the current instance is being instantiated for the first time, the response may include the identifier for the current instance. In other examples, the response may include a no identifier if there is no instance associated with the key. In this case, this may indicate that the key has not been previously registered by an existing instance and the registration of the key is successful.

At 506, application 106 determines if this is the same instance as itself. This may occur if the current instance is returned. If so, at 508, application 106 performs the command with the current instance. For example, application 106 may then proceed to open a window. Also, in some examples, application 106 may open a document for editing. In addition to performing the command, application 106 may then direct operating system 102 to register the instance with the key in operating system storage 104.

If the instance in the response is not the current instance, then at 510, application 106 redirects to another instance of the application. For example, application 106 generates an API message and sends the message to operating system to operating system 102. The API is associated with operating system 102 and thus allows application 106 to communicate the redirect to operating system 102 instead of performing an application-to-application message. In some embodiments, the redirection may be a terminal operation. After calling the API method to redirect, application 106 cannot perform any other actions whether the redirect succeeded or failed. In calling the redirect, application 106 is not handling the activation request. However, because the redirect API request is sent to operating system 102, operating system 102 may more reliably process the redirection.

Complex Key Example

Figure 6:
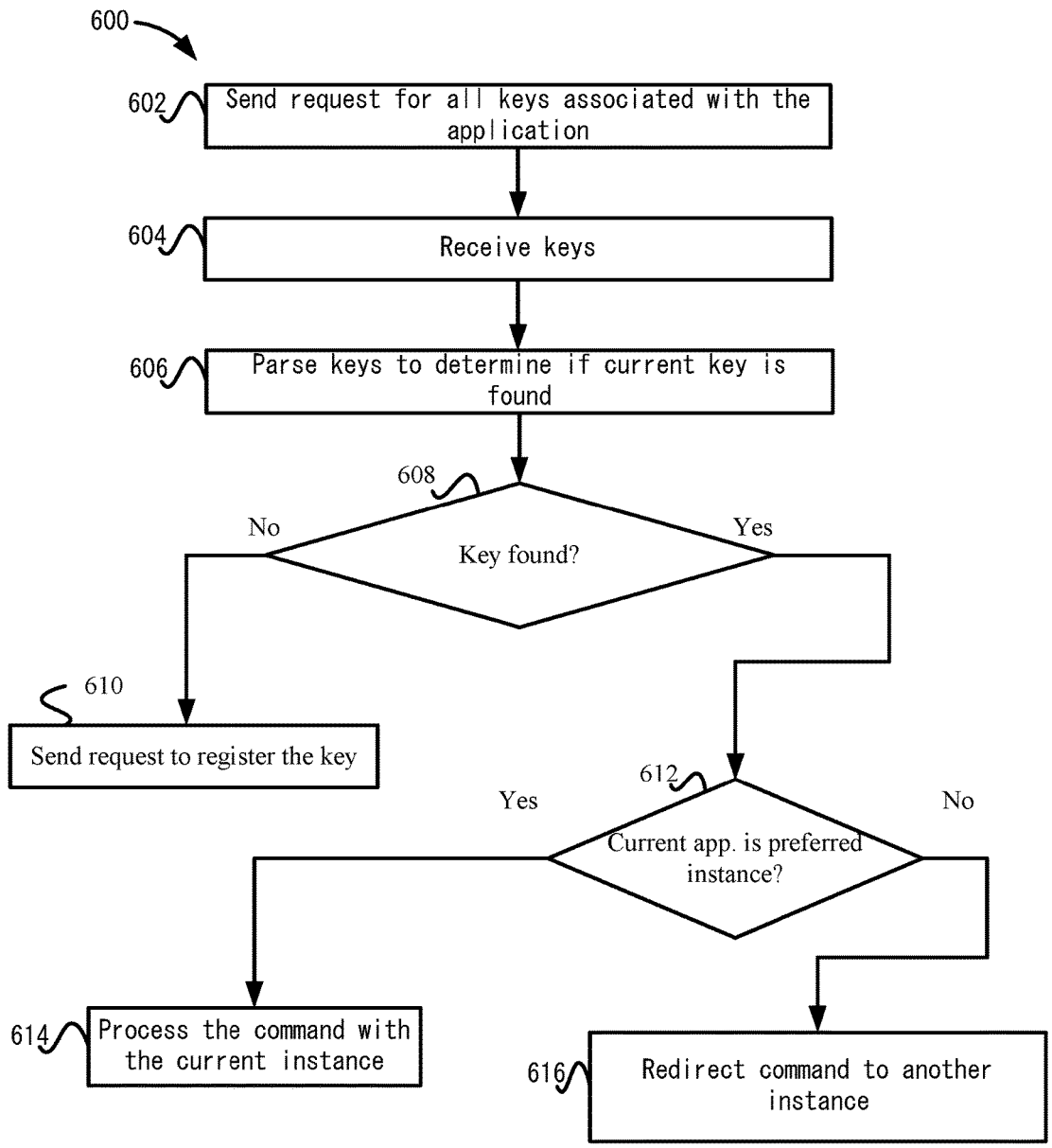
FIG. 6 depicts a more detailed example of the process for registering a complex key according to some embodiments.

The use of the keys may be more complex than described above. FIG. 6 depicts a more detailed example of the process for registering a complex key according to some embodiments. In one example, a first instance of application 106 may have a first document "A.doc" open and a second document "B.doc" open. Thus, the first instance has two documents open and its registration key might be "AB". If a new request for a second instance of application 106 is received for the file "B.doc", application 106 would compose the key "B". Because the keys may be complex, just determining if the key B has been registered exactly may not be sufficient. Rather, application 106 needs to determine if a registered key, such as a key AB, includes the key B.

Referring to FIG. 6, application 106 can receive a command and then generate a new key. At 602, application 106 sends a request for all keys associated with the application through API 108. Application 106 sends the request for all keys because the keys may be complex and a request with just the key B may not be sufficient to determine if another instance has registered the key. At 604, application 106 receives all registered keys for the application. Then, at 606, application 106 parses the keys to determine if the current key is found. For example, application 106 may parse the keys to determine if the key "B" is included within one of the registered keys. In some examples, a key "AB" includes the key "B". Other complex scenarios may also be appreciated, such as defining whether documents have been opened in read only mode or editing mode. For example, a key might include a flag to indicate whether or not the document is being edited or is only open in read-only mode. So one instance might register "Be", another might register "Br", another might register "ABe", "AeBr" and so on. The "e" indicated the document is opened in editing mode and the "r" indicates the document is opened in read only mode.

At 608, application 106 determines if the key was found within one of the received keys. If the key is not found, at 610, application 106 sends a request to register the key to operating system 102 as described above.

If the key is found, then, at 612, application 106 determines if one of the received keys is the preferred instance for the key. The preferred instance may be defined based on application logic. For example, if another instance of the application has the document "B" open already even though that instance has another document open, this may be the preferred instance. If the current application is the preferred instance, then at 614, application 106 processes the command. For example, the document may be opened by the second instance of application 106. In some embodiments, the second instance of application 106 may also send a command to close the document in the other instance. If the current application is not the preferred instance, then at 616, application 106 sends a redirect command to operating system 102 to redirect to another instance. For example, the instance that has open documents "A.doc" and "B.doc" may receive the redirection. In this case, the instance may bring forward "B.doc" for editing by a user.

An application can re-register itself at any time. For example, if the application opens A.doc and registers the key "A", later the application might close A.doc and open B.doc, and at that time the application would register (or attempt to register) the key "B". Or the application might open A.doc in read only and register the key "Ar", then later when the user starts to edit the document, and the application re-registers the key "Ae". Also, if this re-registration fails because another instance has already registered the key"Ae", then this can be reflected in the user interface—telling the user he/she cannot edit this document because the user is already editing it in another instance. Or, the application might close A.doc and not open any other document—at this point the application might register itself as "Empty", so that this instance could be used by any new request for any document that is not already open, instead of creating a new instance for a new document.

CONCLUSION

Accordingly, API 108 allows application 106 to be multi-instanced and also provides a mechanism to perform redirects when an existing instance has already been registered with the same key. The redirection may be performed through operating system 102. The determination is performed efficiently using operating system storage 104, which may associate each application with its registered keys instead of using global information for the keys. Application 106 uses API 108 to parse only the keys associated with the application and not keys for other applications. For example, the message sent by application 106 may be the instance identifier and also a context for the instance, such as a command to bring the window to the foreground.

This allows computer system 100 to enable multi-instanced applications, which may be more convenient for a user and provides a more flexible application. For example, when an application is limited to a single instance, the user may not be able to open multiple documents in different windows. Further, the use of the API to perform the redirection may improve the management of the multiple instances by only allowing one instance to perform the same process, such as opening the same document. This may eliminate errors by a user where multiple instances are opened for the same purpose.

Example Computer System

FIG. 7 depicts a simplified block diagram of an example computer system 700 according to certain embodiments. Computer system 700 can be used to implement any of the computing devices, systems, or servers described in the foregoing disclosure. As shown in FIG. 7, computer system 700 includes one or more processors 702 that communicate with a number of peripheral devices via a bus subsystem 704. These peripheral devices include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700.

Storage subsystem 706 includes a memory subsystem 708 and a file/disk storage subsystem 710. Subsystems 708 and 710 represent non-transitory computer-readable storage media that can store program code and/or data that provide the functionality of embodiments of the present disclosure.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
a processor; and
a computer readable storage medium having stored thereon program code that, when executed by the processor, causes the processor to:
store one or more entries for one or more instances of an application with one or more keys generated for the one or more instances of the application in storage, the one or more instances of the application being instantiated on an operating system of the computer system;
receive a request from the application with a current key for a current instance,
wherein before receiving the request from the application, one or more requests from the one or more instances of the application ware received to register the one or more keys in the storage;
parse the storage to determine if the current key is stored in the one or more keys associated with the application; and
return a response to the application with an indication whether the current key is stored as an entry in the one or more entries, wherein the application uses the response to determine a redirection action that is communicated to one of the one or more instances of the application that are instantiated on the operating system when the current key is associated with an instance other than the current instance.

2. The computer system of claim 1, wherein the current key and one or more keys are generated based on key generation logic in the application.

3. The computer system of claim 1, wherein the current key and the one or more keys are generated based on arguments for a command received by the application.

4. The computer system of claim 1, wherein the application uses the response to determine the current key should be registered for the current instance in the storage for the application when the current key is not associated with the instance other than the current instance.

5. The computer system of claim 1, further configured for:
receive a registration request for the current key from the application when the current key is not found in the one or more keys.

6. The computer system of claim 1, wherein the request is received through an application programming interface (API) supported by the operating system of the computer system.

7. The computer system of claim 1, wherein the operating system of the computer system processes the redirection request.

8. The computer system of claim 1, further configured for:
receive the redirection request from the application; and
send the redirection request to the one of the one or more instances of the application.

9. The computer system of claim 1, wherein the redirection request includes a command for the one of the one or more instances of the application.

10. The computer system of claim 1, further configured for:
receive a request for all of the one or more keys associated with the application; and
return the one or more keys.

11. The computer system of claim 10, wherein the application compares the current key to the one or more keys to determine if the current key is stored in the storage.

12. The computer system of claim 11, wherein the current key is derivable from the one or more keys.

13. The computer system of claim 1, wherein the request is an activation command to open a window for the current instance of the application.

14. The computer system of claim 13, wherein the redirection action is determined in response to the activation request before a window is opened for the current instance of the application.

15. A method comprising:
storing, by a computing device, one or more entries for one or more instances of an application with one or more keys generated for the one or more instances of the application in storage, the one or more instances of the application being instantiated on an operating system of the computer system;
receiving, by the computing device, a request from the application with a current key for a current instance, wherein before receiving the request from the application, one or more requests from the one or more instances of the application were received to register the one or more keys in the storage;
parsing, by the computing device, the storage to determine if the current key is stored in the one or more keys associated with the application; and
returning, by the computing device, a response to the application with an indication whether the current key is stored as an entry in the one or more entries, wherein the application uses the response to determine a redirection action that is communicated to one of the one or more instances of the application that are instantiated on the operating system when the current key is associated with an instance other than the current instance.

16. The method of claim 15, wherein the application uses the response to determine the current key should be registered for the current instance in the storage for the application when the current key is not associated with the instance other than the current instance.

17. The method of claim 15, wherein the request is received through an application programming interface (API) supported by the operating system of the computer system.

18. The method of claim 15, wherein the operating system of the computer system processes the redirection request.

19. A non-transitory computer readable storage medium having stored thereon program code executable by a computer system, the program code causing the computer system to:
store one or more entries for one or more instances of an application with one or more keys generated for the one or more instances of the application in storage, the one or more instances of the application being instantiated on an operating system of the computer system
receive a request from the application with a current key for a current instance; wherein before receiving the request from the application, one or more requests from the one or more instances of the application were received to register the one or more keys in the storage;
parse the storage to determine if the current key is stored in the one or more keys associated with the application; and
return a response to the application with an indication whether the current key is stored as an entry in the one or more entries, wherein the application uses the response to determine a redirection action that is communicated to one of the one or more instances of the application that are instantiated on the operating system when the current key is associated with an instance other than the current instance.

* * * * *